United States Patent
Stelmach

(10) Patent No.: US 7,353,775 B1
(45) Date of Patent: Apr. 8, 2008

(54) ANIMAL ACCOMMODATION STATION

(76) Inventor: John Stelmach, 740 Sixth St., Prescott, AZ (US) 86301

( * ) Notice: Subject to any disclaimer, the term of this patent is extended or adjusted under 35 U.S.C. 154(b) by 408 days.

(21) Appl. No.: 10/932,699

(22) Filed: Sep. 2, 2004

(51) Int. Cl.
 *A01K 5/00* (2006.01)

(52) U.S. Cl. ................................ 119/61.54; 119/61.57; 119/791

(58) Field of Classification Search ............... 119/61.5, 119/61.53, 61.54, 61.57, 786, 787, 788, 791
 See application file for complete search history.

(56) References Cited

U.S. PATENT DOCUMENTS

| | | | | |
|---|---|---|---|---|
| 1,719,769 A | * | 7/1929 | Kaufman | 248/311.2 |
| 2,435,081 A | * | 1/1948 | Howard | 119/786 |
| 2,720,862 A | | 10/1955 | Davis | |
| 3,306,260 A | * | 2/1967 | Ciampi | 119/51.03 |
| 3,734,062 A | | 5/1973 | O'Hara | |
| 4,546,730 A | | 10/1985 | Holland | |
| 5,060,907 A | | 10/1991 | Castano | |
| D353,082 S | | 12/1994 | Keven | |
| 5,421,289 A | * | 6/1995 | Capellaro | 119/475 |
| 5,560,316 A | * | 10/1996 | Lillelund et al. | 119/61.5 |
| 5,996,531 A | * | 12/1999 | Anderson | 119/61.53 |
| 2004/0216697 A1 | * | 11/2004 | Wojcik et al. | 119/786 |

* cited by examiner

*Primary Examiner*—Rob Swiatek
(74) *Attorney, Agent, or Firm*—Parsons & Goltry; Michael W. Goltry; Robert A. Parsons

(57) ABSTRACT

An animal accommodation station includes a base positionable upon a selected surface and supporting a shaft in an upright position. A canopy is carried at the upper end of the shaft. At an intermediate location, a cantilevered beam extends radially from the shaft. Food receptacles are detachably carried by the beam. A collar, rotatably coupled with the shaft intermediate the base and the beam, supports a radially extending arm having a free end to which is attached an animal leash.

42 Claims, 7 Drawing Sheets

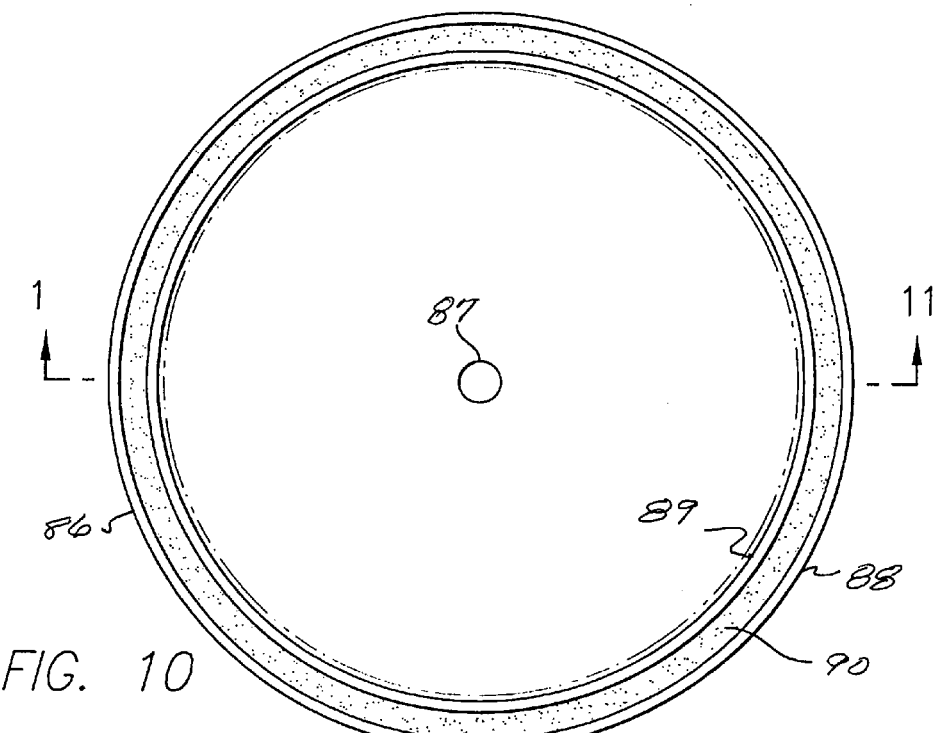
FIG. 10
FIG. 11
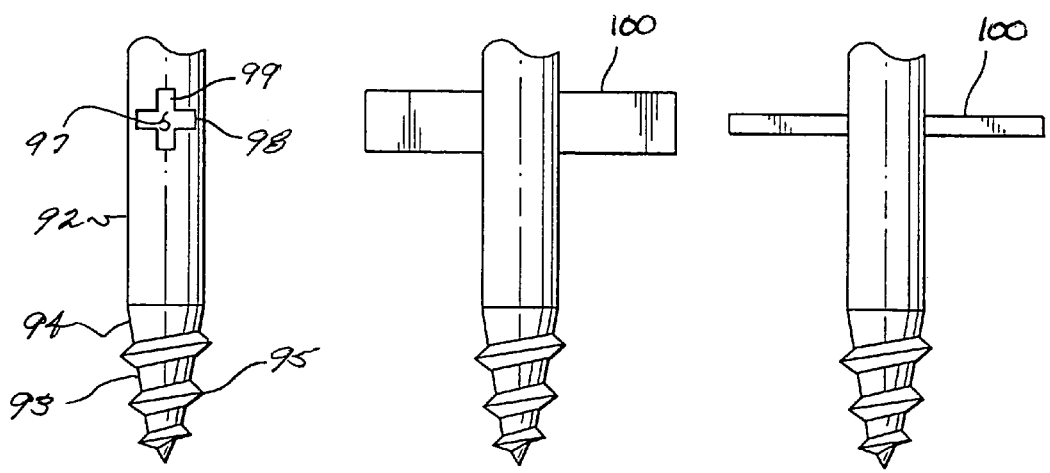
FIG. 12   FIG. 13   FIG. 14

ANIMAL ACCOMMODATION STATION

FIELD OF THE INVENTION

This invention relates to accommodations for animals.

More particularly, the present invention relates to a feeding and tether station for tending to an animal.

In a further and more specific aspect, the instant invention concerns an accommodation station that is easily movable and readily positionable upon a selected surface.

BACKGROUND OF THE INVENTION

The prior art has advanced various apparatus for the accommodation of animals. One such device includes a stake that is driven into the ground. A collar rotatably carried by the stake supports an arm having an end to which is attached an animal leash. It is also known to secure an umbrella to the upper end of the stake.

Also provided by the prior art is an elongate stake having a feeding bowl permanently attached immediately above the section of the stake that is driven into the ground. Accordingly, when the stake is driven into the ground, the feeding bowl is forced against the surface of the ground to stabilize the stake. A pole, having a free end for attachment of an animal leash, is pivotally mounted upon the stake above the feeding bowl.

In order to prevent entanglement of the leash with the feeding bowl, the length of the leash is limited to a length no longer than is necessary for the animal to reach the feed bowl. It is also noted that the prior art devices require specific placement upon the ground to accommodate the stake.

It would be highly advantageous the remedy the foregoing and other problems inherent in the prior art.

SUMMARY OF THE INVENTION

The above problems and others are at least partially solved and the above purposes and others realized in new and improved animal accommodation station embodying the teachings of the present invention.

In accordance with the principles of the instant invention provided is a base having a peripheral edge and receivable upon a selected surface and capable of receiving a foot of an animal thereon. A shaft, having a lower end affixed to the base, extends upwardly. A feed assembly is carried by the base. Also provided is an animal tether assembly carried by the shaft intermediate the base and the feed assembly.

In accordance with an embodiment of the invention, the base includes a plurality of spaced apart legs extending radially from the lower end of the shaft. A plate overlays the legs and has a peripheral edge outboard of the legs. A continuous trough is formed into the plate proximate the peripheral edge thereof.

Further, in accordance with the principles of this invention, a cantilevered beam projects from the shaft. A food receptacle is carried by the beam. An element of an engagement pair is carried by the beam a complemental element of the engagement is carried by the food receptacle, whereby the food receptacle is detachably securable to the beam. Preferably, the element of the engagement includes an indentation formed into the beam. The complemental element includes an appendage projecting for the food receptacle and matingly engagable with the indentation. A second food receptacle also having a complemental element of said engagement pair is detachably securable to the indentation in the beam in opposition to the first food receptacle.

The animal tether assembly, in accordance with a preferred embodiment thereof, includes a first restraint secured to the shaft and a second restraint secured to the shaft a location spaced from the first restraint. A collar is rotatably carried by the shaft intermediate the restraints. Attachment means are carried by the collar for couplement with an animal leash. The attachment means may include an arm extending radially from the collar and couplement means carried at the free end thereof. It is also within the scope of the invention that a canopy be carried by the shaft proximate an upper end thereof.

In accordance with the principles of the present invention, the element of the engagement pair integral with the beam includes first and second outwardly directed surfaces. The complemental element of the engagement pair carried by the food receptacle includes a first surface receivable in juxtaposition with the first surface of the element and a second surface receivable in juxtaposition in with second surface of the element. A pair of spaced apart abutments is carried by the beam for receiving the complemental element therebetween to retard movement of the food receptacle relative to the beam.

It is within the principles of the immediate invention that the complemental element of the engagement pair carried by first food receptacle is bifurcated into a first and a second segment. Similarly, the complemental element of the engagement pair carried by the second food receptacle is bifurcated into a first segment and a second segment. When attached to the element of the engagement pair carried by the beam, a segment carried by the first food receptacle is received between the first and second segments carried by the second food receptacle. Concurrently, an segment carried by the second food receptacle is received intermediate the first and second segments carried by the first food receptacle.

The beam is securable to any selected structure such as an upright panel. It is also contemplated that the shaft may terminate at the lower end thereof with an auger.

It is consistent with the principles of this invention that a predetermined length of the beam be constricted to a lesser cross section thereby defining the element of the engagement pair carried by the beam. The element defined by the lesser cross section includes an upper surface, a first outwardly directed surface depending from the upper surface and a second outwardly directed surface depending from the upper surface in spaced apart opposition to the first outwardly directed surface. An abutment resides at either end of the element.

First and second food receptacles include complemental elements of the engagement pair for detachable securement to the element of the engagement pair carried by the beam intermediate the abutments.

In a further embodiment, the complemental element of the engagement carried by the first food receptacle includes a first inwardly directed surface receivable in juxtaposition with the first outwardly directed surface of the element of the engagement carried by the beam. A spine extending from the first inwardly directed surface includes an under surface receivable upon the upper surface of the element carried by the beam. A flange depending from the spine includes a second inwardly directed surface receivable in juxtaposition with the second surface of the element of the engagement pair.

The complemental element of the engagement pair carried by the second food receptacle includes a first inwardly directed surface receivable in juxtaposition with the second outwardly directed surface of the element of the engagement pair. A spine extending from the first inwardly directed surface includes an under surface receivable upon the top surface of the element of the engagement pair. A flange depends from the spine and carried a second inwardly directed surface which is received in juxtaposition with the first outwardly directed surface of the complemental element of the engagement pair integral with the beam.

BRIEF DESCRIPTION OF THE DRAWINGS

The foregoing and further and more specific objects and advantages of the instant invention will become readily apparent from the following detailed description of preferred embodiment thereof, taken in conjunction with the drawings, in which:

FIG. 10 is a top plan view of an alternate base useful with the animal accommodation station seen FIG. 1;

FIG. 11 is a vertical sectional view taken along the line 11-11 of FIG. 10;

FIG. 12 is a fragmentary elevational view of an alternate base incorporating the teachings of this invention;

FIG. 13 is a view generally similar to the view of FIG. 12 and specifically illustrating a use thereof;

FIG. 14 is a view generally similar to the view of 12 and specifically illustrating another mode thereof;

DETAILED DESCRIPTION OF PREFERRED EMBODIMENTS

Figure 1:
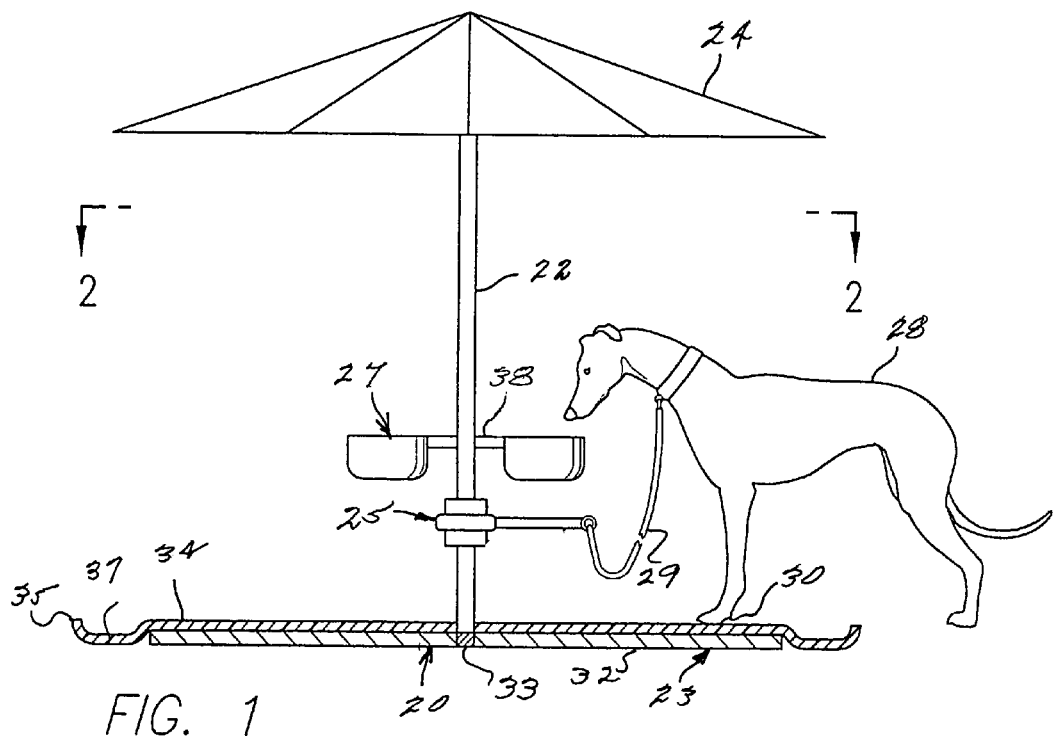
FIG. 1 is an elevation view of an animal accommodation station embodying the principles of the instant invention.

Turning now to the drawings, in which like reference characters indicate corresponding elements through the several view, attention is first directed to FIG. 1, in which is illustrated an animal accommodation center, constructed in accordance with the principles of the instant invention and generally designated by the reference character 20 including shaft 22 supported in the upright position by base 23 and, in turn, supporting canopy 24 proximate an upper end thereof. Canopy can be a conventional umbrella or other structure that will readily occur to those skilled in the art.

Animal tether assembly 25 and feed assembly 27, as will be described in detail as the description ensues, are carried by shaft 22 intermediate base 23 and canopy 24. Also seen is an animal 28, herein chosen for purposes of illustration as a dog, is tethered to tether assembly by leash 29. It is noted that, in accordance with a preferred embodiment of the invention, animal 28 must place at least one of the front feet 30 upon base in order to feed from the feed assembly 27. It is within the scope of the invention that leash may be of any desired length.

Figure 2:
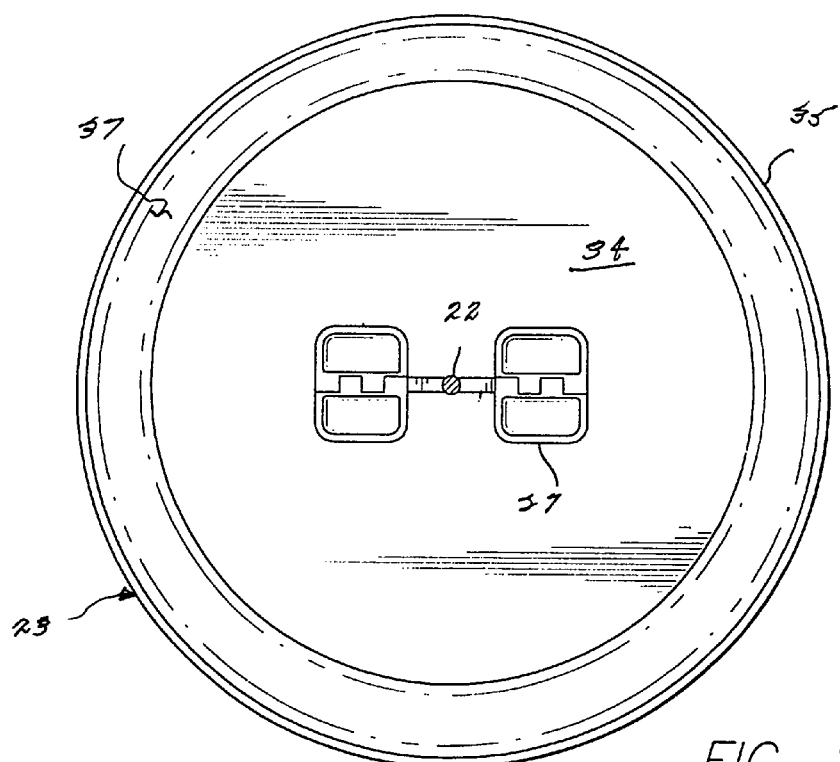
FIG. 2 is a horizontal sectional view taken along the line 2-2 of FIG. 1.
Figure 3:
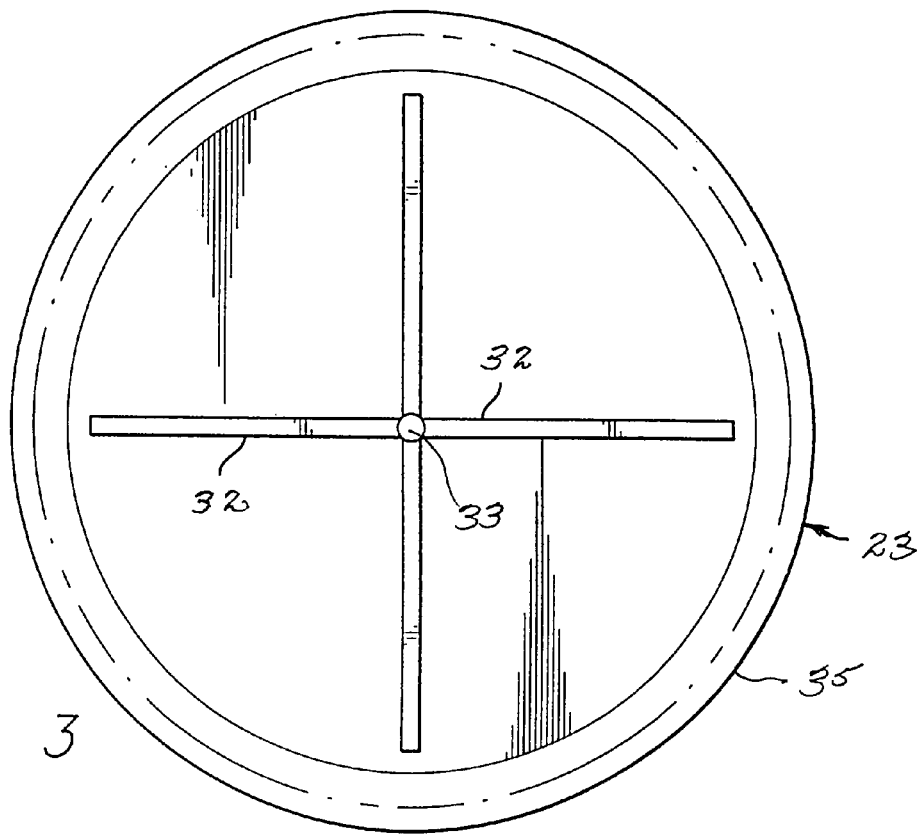
FIG. 3 is a bottom plan view.

As viewed with additional reference to FIGS. 2 and 3, base 23 includes a plurality of spaced apart legs 32 which extend radially outward from the lower end 33 of shaft 22. Plate 34, having outer peripheral edge 35, overlies legs 32. A continuous trough 37 is formed into plate 34 proximate peripheral edge 35. It is apparent from the foregoing description that base 23 can be placed upon any selected surface, which may be soft as ground or hard as cement. The weight of animal 28 upon base 23 during feeding from feed assembly 27 stabilizes the structure. Any food which falls to the surface upon plate 34 will be retained within trough 37.

Figure 4:
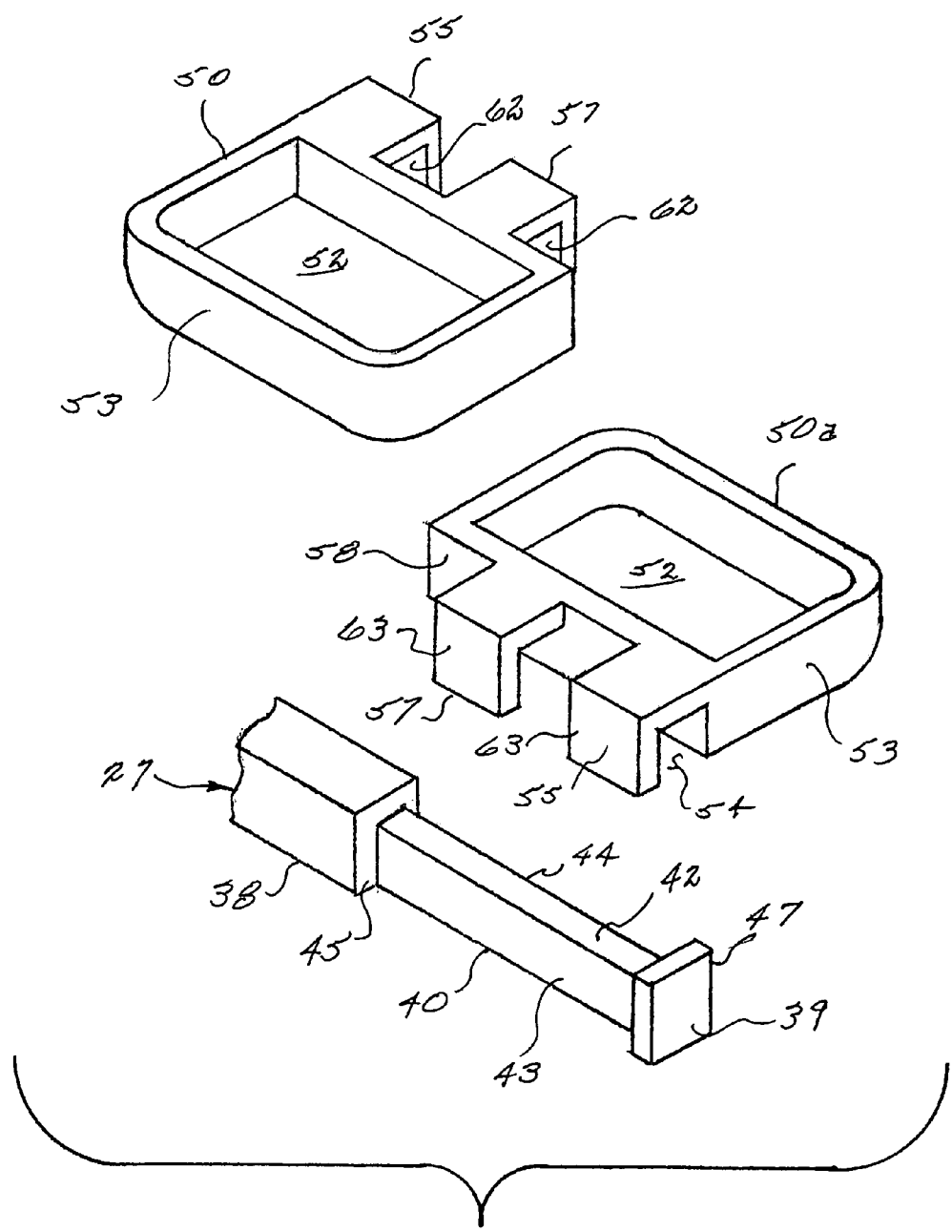
FIG. 4 is a fragmentary exploded perspective view of a preferred feed assembly, including receptacles and a beam, used in connection with the animal accommodation station of FIG. 1.

Reference is now made to FIG. 4, in which it is seen that feed assembly 27 includes cantilevered beam 38 supported by shaft 22, as seen with momentary reference to FIG. 1, and terminating with free end 39. An element 40 of an engagement pair is formed into beam 38. The element 40 is of constricted cross section. That is, element 40 has a width and a height that is lesser then the corresponding width and height of beam 38. Element 40 includes top surface 42, first outwardly directed surface 43 depending from top surface 42, and a second outwardly directed surface 44 depending from top surface 42 in opposition to first surface 43. Element 40 is of predetermined length, having surfaces 42, 43 and 44 which reside intermediate abutments 45 and 47. Further description of element 40 will be made presently.

Further illustrated in FIG. 4, are two food receptacles 50 and 50a. The receptacles are identical. Each includes a bottom 52 supporting an upright, continuous peripheral sidewall 53.

A complemental element 54 of the previously described engagement pair is integral with each food receptacle 50 and 50a. The complemental element 54 is bifurcated into first and second spaced apart segments 55 and 57, respectively. Complemental element 54 is defined by surface 58 integral with sidewall 53, under surface 59 carried by spine 60 extending from surface 58 and inner surface 62 carried by flange 63 depending from spine 60. Surface 59 is viewed with reference to FIG. 6. Surfaces 58 and 62 are inwardly directed and opposed.

Figures 6, 6A:
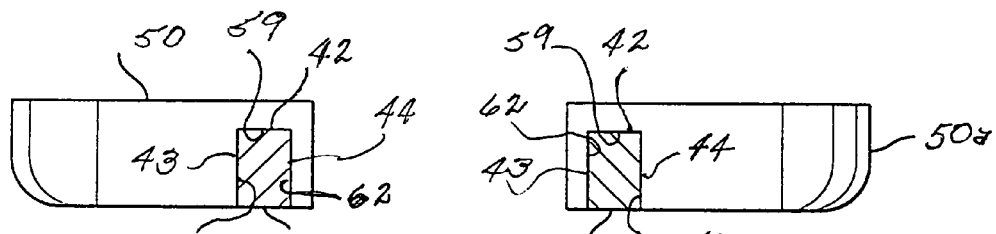
FIG. 6 is a vertical sectional view taken along the line 6-6 of FIG. 5.
FIG. 6a is a vertical sectional view taken along the line 6a-6a of FIG. 5.
Figure 5:
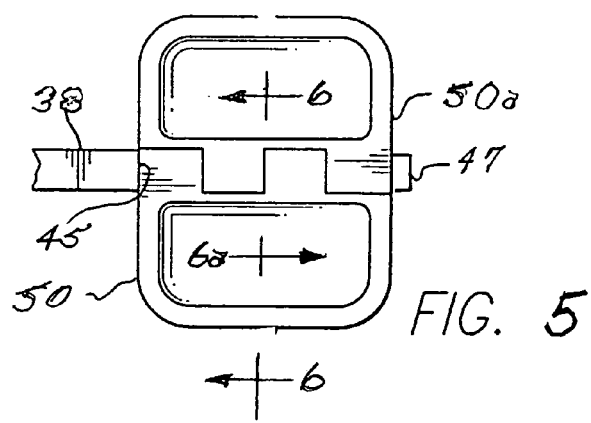
FIG. 5 is a top plan view of the assembled elements of the feed assembly seen in FIG. 4.

As illustrated in FIG. 5, food receptacles 50 and 50a are held in opposition by beam 38. Referring to FIG. 6 in which food receptacle 50 is secured to beam 38, it is seen that under surface 59 of complemental element 54 rests upon top surface 42 of element 40. Concurrently, surface 58 is in juxtaposition with surface 43 and surface 62 is in juxtaposition with surface 44.

Food receptacle 50a is detachably secured to beam 38 in opposition to food receptacle with under surface 59 bearing upon top surface 42 of element 40. Concurrently, surface 62 resides in juxtaposition with surface 43 and surface 58 resides in juxtaposition with surface 44.

With additional reference to FIG. 5, it is seen that segment 57 of food receptacle 50a is received intermediate segments 55 and 57 of food receptacle 50. Conversely, segment 57 of food receptacle 50 resides intermediate segments 55 and 57 of food receptacle 50a. The several segments, segments 55 and 57 of food receptacle 50 and segments 55 and 57 of food receptacle 50a, are received intermediate abutments 45 and 47 which retards movement of the food receptacles relative to beam 38.

Figure 7:
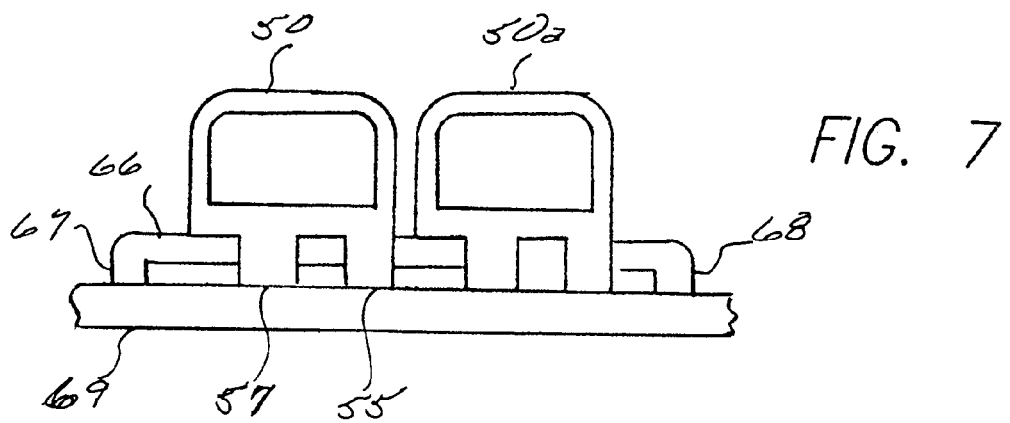
FIG. 7 is a top plan view of an alternate feed assembly constructed in accordance with the teachings of the instant invention.
Figure 8:
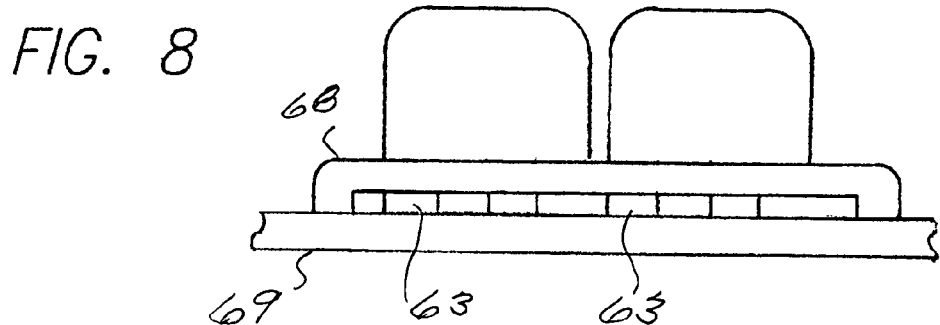
FIG. 8 is a bottom plan view of the alternate feed assembly seen in FIG. 7.

Turning now to FIGS. 7 and 8, there is illustrated an alternate embodiment of the present invention including beam 66 having flanges 67 and 68 at terminal ends thereof which are secured to an upright panel 69, such as a wall. In accordance with the immediate embodiment, beam 66 is sized and includes surfaces as previously described in connection with element 40 of the engagement pair. Accordingly, previously food receptacles 50 and 50a can be detachably secured in tandem.

Figure 9:
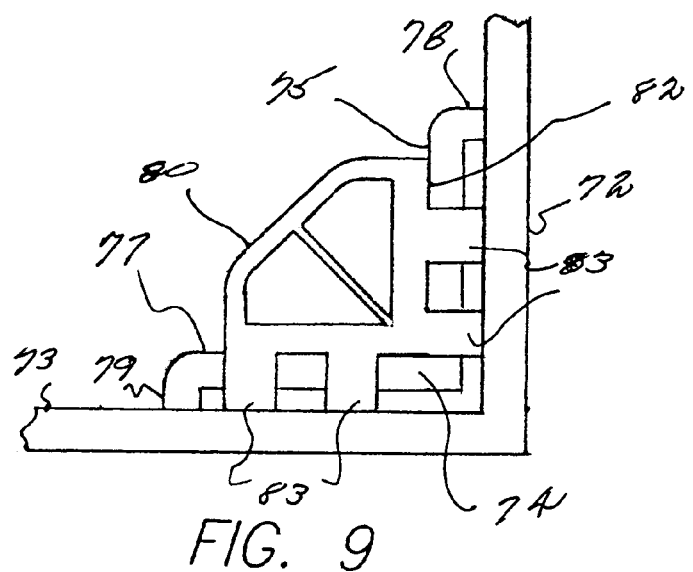
FIG. 9 is a top plan view of another alternate feed assembly embodying the principles of this invention.

Another alternate embodiment, constructed in accordance with the principles of this invention, is depicted in FIG. 9. The immediate embodiment is especially adapted to be detachably secured in a corner as represented by the angularly disposed panels 72 and 73. Beam 74 includes legs 75 and 77 which are angularly disposed to concur with panels 73 and 74. Beam 74 is held in spaced relationship and secured to the panels 72 and 73 by angularly disposed ends 78 and 79, respectively.

Food receptacle 80 includes rear surface 82 which is angular and adapted to be received in juxtaposition with beam 74. Segments 83, similar to previously described segments 55 and 57, are detachably engageable with beam 74. In all other aspects not specifically described, the immediate embodiment is similar to the previously described embodiments.

FIGS. 10 and 11 illustrate another plate 86 consistent with the principles of the instant invention and alternately usable in connection with the embodiment of the invention illustrated and described in connection FIG. 1. Opening 87, proximate the center of plate 86, accommodates shaft 22. Plate 86 terminates, at the outer peripheral edge, with an upstanding, continuous wall 88. Spaced inboard and concentric with wall 88 is a second wall 89. The walls 88 and 89 define a moat 90 which may be filled with water or other selected liquid to deter crawling insects from access to the food held in the receptacles.

Reference is now made to FIG. 12 in which is seen an alternate shaft 92 terminating at the lower end with an auger 93 having tapered section 94 supporting helix 95. A cross-shaped aperture 97 having horizontal slot 98 and vertical slot 99 is formed through shaft 92. A beam 100 having a substantial height and reduced thickness can be inserted into slot 98 and used as a handle for rotating shaft 92 to screw the auger 93 into the earth as seen in FIG. 14. The beam 100 is then removed and reinserted into slot 99 to function as a support for food receptacles. It will be appreciated by those in the art that in each use the load bears upon the direction of strength of the beam 100.

Figure 15:
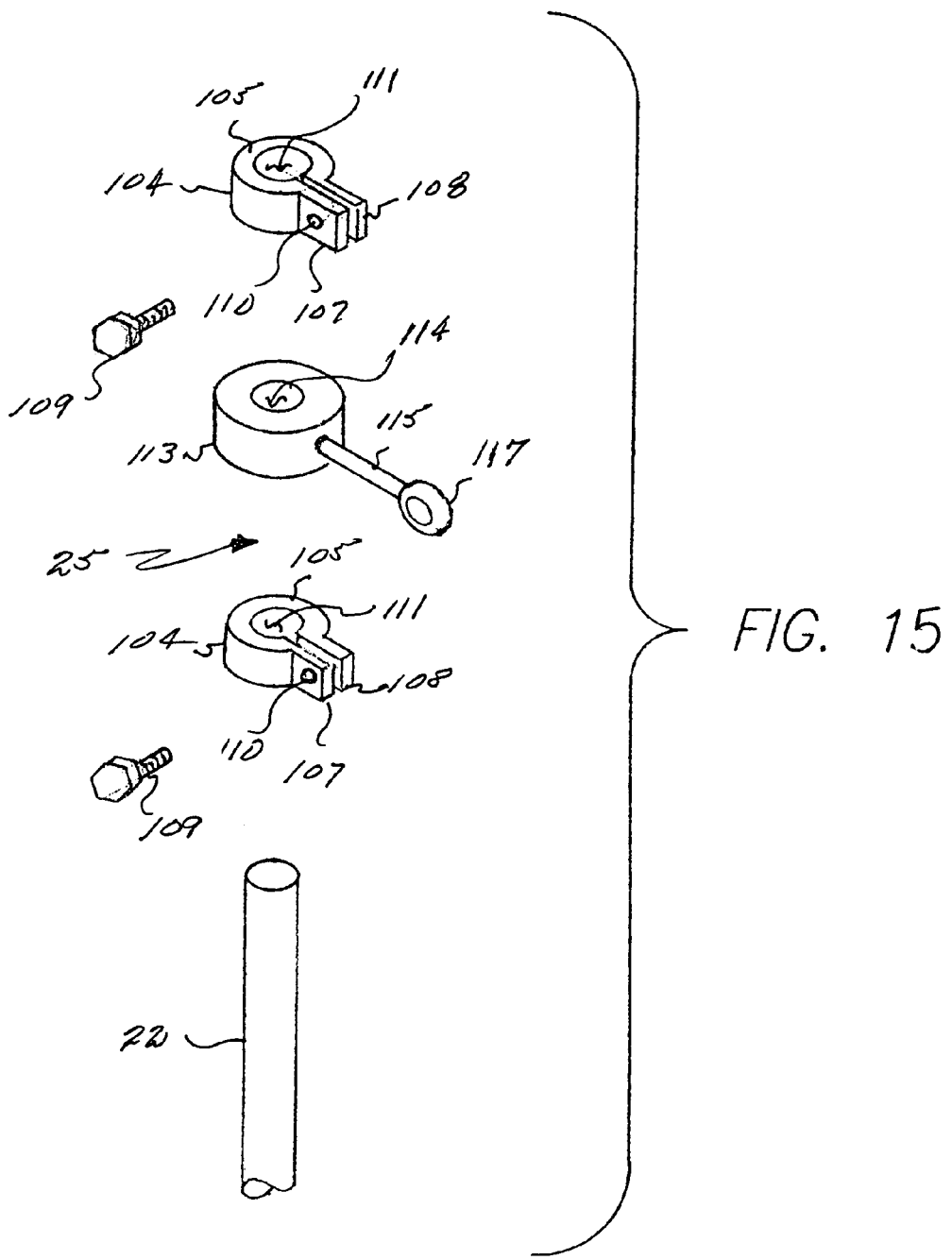
FIG. 15 is an exploded perspective view of a tether assembly useful in connection with the animal accommodation station of FIG. 1.

Tether assembly 25 will now be described in detail with reference to FIG. 15. Provided are two retention members 104, each having a body 105 in the form of a split collar. First flange 107 and second flange 108 project outwardly from respective ends of the split. A screw 109 is rotatably received through opening 110 in flange 107 and is threadably engage within flange 108. Shaft 22 is received within opening 111. When screw 109 is tightened, retention member 104 is clamped to shaft 22. Such devices are well known to those in the art.

Next provided is collar 113 having opening 114 which receives shaft 22 in rotatable union. Arm 115 terminates with couplement member 117 extending radially from collar 113. Couplement member 117 is herein chosen for purposes of illustration as a ring. Other couplement members for engagement with the end of a leash will readily occur to those skilled in the art.

Retention members 104 are secured to shaft 22 in spaced apart relationship. Collar 113 is rotatably retained therebetween.

Figure 16A:
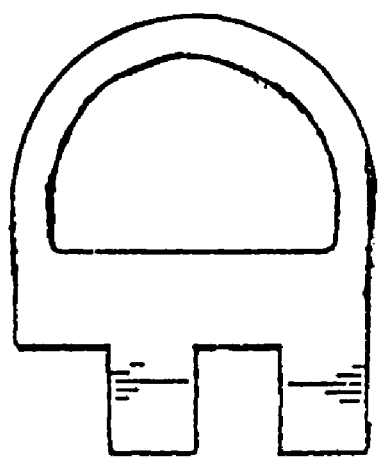
FIGS. 16a and 16b show designs of receptacles to be used in connection with the invention.
Figure 16B:
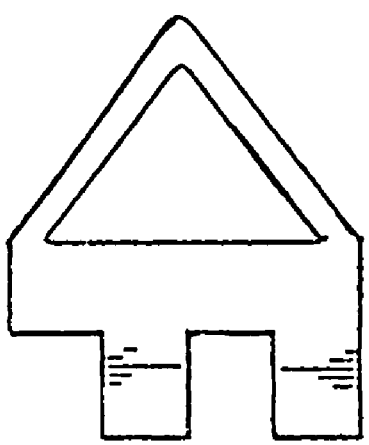

The present invention is described above with reference to preferred embodiments. However, those skilled in the art will recognize that changes and modifications may be made in the described embodiment without departing from the nature and scope of the present invention. For instance, receptacles 50 and 50a are generally rectangular in shape. Other shapes can be used. For instance, FIG. 16a shows a receptacle having a rounded shape, and FIG. 16b shows a receptacle having a generally triangular shape. These shapes are disclosed only as a matter of example, and it is to be understood that receptacles 50 and 50a, and also receptacle 80, can be provided in any desired shape for accommodating specific applications, for accommodating spatial constraints, or for accommodating specific aesthetic preferences. Various further changes and modifications to the embodiment herein chosen for purposes of illustration will readily occur to those skilled in the art. To the extent that such modifications and variations do not depart from the spirit of the invention, they are intended to be included within the scope thereof.

Having fully described the invention in such clear and concise terms as to enable those skilled in the art to understand and practice the same,

The invention claimed is:

1. An animal accommodation station comprising:
    a base having a peripheral edge and positionable upon a selected surface and capable of receiving a foot of an animal thereon;
    a shaft having a lower end affixed to said base and extending upwardly therefrom;
    a feed assembly carried by said shaft;
    an animal tether assembly carried by said shaft intermediate said base and said feed assembly for couplement with an animal leash; and
    said base includes a plurality of spaced apart legs projecting radially from the lower end of said shaft, and a plate overlying said legs and having a peripheral edge outboard of said legs.

2. The animal accommodation station of claim 1, further including a continuous trough carried by said base proximate said peripheral edge.

3. The animal accommodation station of claim 1, further including a continuous trough formed in said plate proximate the peripheral edge thereof.

4. The animal accommodation station of claim 1, wherein said feed assembly includes:
    a cantilevered beam projecting from said shaft; and
    a food receptacle detachably carried by said beam.

5. The animal accommodation station of claim 4, further including:
    an element of an engagement pair carried by said beam; and
    a complementary element of said engagement pair carried by said food receptacle.

6. The animal accommodation station of claim 5, wherein:
    said element of said engagement pair includes an indentation formed into said beam; and
    said complementary engagement element of said engagement pair includes a spine projecting from said food receptacle and matingly engageable with said indentation.

7. The animal accommodation station of claim 6, further including a second food receptacle having a complementary element of said engagement pair and detachably securable to said beam in opposition to said first food receptacle.

8. The animal accommodation station of claim 1, wherein said tether assembly includes:
   a first restraint member secured to said shaft;
   a second restraint member secured to said shaft at a location spaced from said first restraint member;
   a collar rotatably carried by said shaft intermediate said first restraint and said second restraint; and
   attachment means carried by said collar for couplement with said animal leash.

9. The animal accommodation station of claim 8, further including:
   an arm extending radially from said collar and having a free end; and
   couplement means carried at the free end of said arm for engagement with a leash.

10. The animal accommodation station of claim 1, further including a canopy carried by said shaft proximate an upper end thereof.

11. An animal accommodation station comprising:
   a beam projecting from a selected structure;
   an element of an engagement pair integral with said beam;
   a food receptacle;
   a complemental element of said engagement pair carried by said food receptacle and couplable with said element of said engagement pair for detachable securement of said food receptacle to said beam;
   said element of said engagement pair received within said complemental element of said engagement pair; and
   a pair of spaced apart abutments carried by said beam for receiving said food receptacle therebetween to retard movement of said food receptacle relative to said beam.

12. The animal accommodation station of claim 11, wherein:
   said element of said engagement pair includes a first outwardly directed surface and a second outwardly directed surface opposing said first surface; and
   said complemental element of said engagement pair includes a first surface receivable in juxtaposition with the first surface of said element and a second surface receivable in juxtaposition with the second surface of said element.

13. The animal accommodation station of claim 11, further including:
   a second food receptacle; and
   a second complemental element of said engagement pair carried by said second food receptacle and couplable with said element of said engagement pair;
   said second food receptacle being detachably securable to said beam in concert with said first food receptacle.

14. The animal accommodation station of claim 11, wherein said complemental element of said engagement pair is bifurcated into a first segment and a spaced apart second segment, said feeding station further including:
   a second food receptacle; and
   a second complemental element of said engagement pair carried by said second food receptacle and receivable between said segments of said first element of said engagement pair when said second food receptacle is detachably secured to said beam in opposition to said first food receptacle.

15. The animal accommodation station of claim 11, wherein said selected structure is an upright panel.

16. An animal accommodation station comprising:
   a base;
   a shaft extending upwardly from said base;
   a beam projecting radially from said shaft;
   a predetermined length of said beam being constricted to a lesser cross section defining an element of an engagement pair including an upper surface, a first outwardly directed surface depending from said upper surface, a second outwardly directed surface depending from said upper surface in spaced opposition to said first upright surface and an abutment at either end of said element of said engagement pair;
   a food receptacle; and
   a complemental element of said engagement pair integral with said food receptacle for detachable securement to the element of said engagement pair intermediate said abutments.

17. The animal accommodation station of claim 16, further including:
   a second food receptacle; and
   a complemental element of said engagement pair integral with said second food receptacle for detachable securement to the predetermined length of said beam intermediate said abutments in juxtaposition with the complemental element of said engagement pair integral with said first food receptacle.

18. The animal accommodation station of claim 17, wherein the complemental element of said engagement pair integral with the first food receptacle includes a first inwardly directed surface receivable in juxtaposition with said first outwardly directed surface of the element of said engagement pair carried by said beam, a spine extending from said first surface and having an under surface receivable upon the upper surface of the element of said engagement pair and a flange depending from said spine and having a second inwardly directed surface depending from said spine and receivable in juxtaposition with said second outwardly directed surface of the element of said engagement pair carried by said beam.

19. The animal accommodation station of claim 18, wherein the complemental element of said engagement pair integral with said second food receptacle includes a first inwardly directed surface receivable in juxtaposition with said second outwardly directed surface of the predetermined length of said beam, a spine extending from said first surface and having an under surface receivable upon the upper surface of said predetermined length of said beam and a flange depending from said spine and having a second inwardly directed surface receivable in juxtaposition with the first outwardly directed surface of the element of said engagement pair carried by said beam.

20. The animal accommodation station of claim 19, wherein:
   the complemental element carried by said first food receptacle is bifurcated into a first section and a spaced apart second section;
   the complemental element carried by said second food receptacle is bifurcated into a first segment and a spaced apart second segment; and wherein:
   a section of said complemental element carried by said first food receptacle is received intermediate the first and second segments of the complemental element carried by the second food receptacle; and
   a segment of the complemental element carried by said second food receptacle is received intermediate the first and second segments of the complemental element carried by the first food receptacle.

21. The animal accommodation station of claim 20, wherein said base includes a plate positionable upon a selected surface and capable of receiving a foot of an animal thereon.

22. The animal accommodation station of claim 21, wherein said base further includes:
a peripheral edge; and
a continuous trough formed in said plate proximate the peripheral edge thereof.

23. The animal accommodation station of claim 20, further including a canopy carried by said shaft proximate an upper end thereof.

24. The animal accommodation station of claim 20, further including an animal tether assembly carried by said shaft intermediate said base and said beam for couplement with an animal leash.

25. The animal accommodation station of claim 20, wherein said animal tether assembly includes:
a collar rotatably carried by said shaft; and
attachment means carried by said collar for couplement with said animal leash.

26. The animal accommodation station of claim 25, wherein said tether assembly further includes:
a first restraint member secured to said shaft; and
a second restraint member secured to said shaft and spaced from said first restraint member;
said collar residing intermediate said first and second restraints.

27. The animal accommodation station of claim 25, wherein said tether assembly further includes:
an arm extending radially from said collar and having a free end; and
couplement means carried at the free end of said arm for engagement with said leash.

28. An animal accommodation station comprising:
a base having a peripheral edge and positionable upon a selected surface and capable of receiving a foot of an animal thereon;
a shaft having a lower end affixed to said base and extending upwardly therefrom;
a feed assembly carried by said shaft;
an animal tether assembly carried by said shaft intermediate said base and said feed assembly for couplement with an animal leash;
said feed assembly including a cantilevered beam projecting from said shaft, and a food receptacle detachably carried by said beam;
an element of an engagement pair carried by said beam;
a complementary element of said engagement pair carried by said food receptacle;
said element of said engagement pair including an indentation formed into said beam; and
said complementary engagement element of said engagement pair including a spine projecting from said food receptacle and matingly engagable with said indentation.

29. The animal accommodation station of claim 28, further including a continuous trough carried by said base proximate said peripheral edge.

30. The animal accommodation station of claim 28, wherein said base includes:
a plurality of spaced apart legs projecting radially from the lower end of said shaft; and
a plate overlying said legs and having a peripheral edge outboard of said legs.

31. The animal accommodation station of claim 30, further including a continuous trough formed in said plate proximate the peripheral edge thereof.

32. The animal accommodation station of claim 28, further including a second food receptacle having a complementary element of said engagement pair and detachably securable to said beam in opposition to said first food receptacle.

33. The animal accommodation station of claim 28, wherein said tether assembly includes:
a first restraint member secured to said shaft;
a second restraint member secured to said shaft at a location spaced from said first restraint and said second restraint member;
a collar rotatably carried by said shaft intermediate said first restraint member and said second restraint member; and
attachment means carried by said collar for couplement with said animal leash.

34. The animal accommodation station of claim 33, further including:
an arm extending radially from said collar and having a free end; and
couplement means carried at the free end of said arm for engagement with a leash.

35. The animal accommodation station of claim 28, further including a canopy carried by said shaft proximate an upper end thereof.

36. An animal accommodation station comprising:
a beam projecting from a selected structure;
an element of an engagement pair integral with said beam;
a food receptacle;
a complemental engagement element of said engagement pair carried by said food receptacle and couplable with said element of said engagement pair for detachable securement of said food receptacle to said beam; and
said complemental element of said engagement pair bifurcated into a first segment and a spaced apart second segment, said feeding station further including a second food receptacle, and a second complemental element of said engagement pair carried by said second food receptacle and receivable between said segments of said first element of said engagement pair when said second food receptacle is detachably secured to said beam in opposition to said first food receptacle.

37. The animal accommodation station of claim 36, wherein said element of said engagement pair is received within said complemental element of said engagement pair.

38. The animal accommodation station of claim 37, further including a pair of spaced apart abutments carried by said beam for receiving said food receptacle therebetween to retard movement of said food receptacle relative to said beam.

39. The animal accommodation station of claim 36, wherein:
said element of said engagement pair includes a first outwardly directed surface and a second outwardly directed surface opposing said first surface; and
said complemental element of said engagement pair includes a first surface receivable in juxtaposition with the first surface of said element and a second surface receivable in juxtaposition with the second surface of said element.

40. The animal accommodation station of claim 36, further including:
   a second food receptacle; and
   a second complemental element of said engagement pair carried by said second food receptacle and couplable with said element of said engagement pair;
   said second food receptacle being detachably securable to said beam in concert with said first food receptacle.

41. The animal accommodation station of claim 36, wherein said selected structure is an upright panel.

42. The animal accommodation station of claim 36, wherein said selected structure includes an upright shaft having an auger at the lower end thereof.

* * * * *